US012641202B2

(12) United States Patent
Oikawa

(10) Patent No.: US 12,641,202 B2
(45) Date of Patent: May 26, 2026

(54) ELECTRO-OPTICAL DEVICE AND ELECTRONIC APPARATUS

(71) Applicant: SEIKO EPSON CORPORATION, Tokyo (JP)

(72) Inventor: Hiroyuki Oikawa, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 496 days.

(21) Appl. No.: 18/128,476

(22) Filed: Mar. 30, 2023

(65) Prior Publication Data

US 2023/0319242 A1 Oct. 5, 2023

(30) Foreign Application Priority Data

Mar. 31, 2022 (JP) ................................ 2022-058548

(51) Int. Cl.
*H04N 9/31* (2006.01)
*G02F 1/1362* (2006.01)
*G02F 1/1368* (2006.01)

(52) U.S. Cl.
CPC ..... *H04N 9/3105* (2013.01); *G02F 1/136209* (2013.01); *G02F 1/136286* (2013.01); *G02F 1/1368* (2013.01)

(58) Field of Classification Search
CPC ......... G02F 1/136209; G02F 1/136286; G02F 1/1368
See application file for complete search history.

(56) References Cited

U.S. PATENT DOCUMENTS

| | | | |
|---|---|---|---|
| 2008/0017885 A1 | 1/2008 | Ishii | |
| 2019/0331972 A1* | 10/2019 | Nimura | H10D 30/6723 |
| 2020/0312890 A1* | 10/2020 | Oikawa | H10D 30/6723 |
| 2021/0389634 A1* | 12/2021 | Ito | G02F 1/136209 |

FOREIGN PATENT DOCUMENTS

| | | |
|---|---|---|
| JP | 2007-304353 A | 11/2007 |
| JP | 2008-225034 A | 9/2008 |
| JP | 2008-293045 A | 12/2008 |
| JP | 2022-090230 A | 6/2022 |

* cited by examiner

*Primary Examiner* — David Y Chung
(74) *Attorney, Agent, or Firm* — OLIFF PLC

(57) ABSTRACT

An electro-optical device includes a substrate, a pixel electrode, a transistor disposed in a layer between the pixel electrode and the substrate, a gate relay electrode disposed in a layer between the pixel electrode and the transistor, and a light blocking shield layer disposed in a layer between the gate relay electrode and the transistor. The gate relay electrode is electrically coupled to a gate electrode of the transistor, and includes an opening portion at a position overlapping, at least in plan view, a gap formed between the gate electrode and the light blocking shield layer in plan view.

5 Claims, 7 Drawing Sheets

ELECTRO-OPTICAL DEVICE AND ELECTRONIC APPARATUS

The present application is based on, and claims priority from JP Application Serial Number 2022-058548, filed Mar. 31, 2022, the disclosure of which is hereby incorporated by reference herein in its entirety.

BACKGROUND

1. Technical Field

The present disclosure relates to an electro-optical device and an electronic apparatus.

2. Related Art

An electro-optical device such as a liquid crystal display device capable of changing optical characteristics for each pixel is used in an electronic apparatus such as a projector. An electro-optical device disclosed in JP-A-2008-225034 includes a substrate, a pixel electrode provided for each of pixels, a transistor having a lightly doped drain (LDD) structure as a switching element of the pixel electrode, and a light shielding film disposed between the substrate and the transistor. The transistor includes a semiconductor layer including a channel region, a source region, a drain region, a low concentration source region, and a low concentration drain region, and a gate electrode overlapping the channel region in plan view. The light shielding film is disposed in a lattice shape surrounding the pixel electrode in plan view, and overlaps the transistor in plan view.

Further, the light shielding film is used as a scanning line for supplying a gate potential to the gate electrode.

It is known that the closer the light shielding film is to the semiconductor layer included in the transistor, the more the light-shielding properties are improved. However, since the light shielding film that can function as the scanning line disclosed in JP-A-2008-225034 overlaps the entire region of the transistor in plan view, there is a concern that an off-leak current increases when the light shielding film comes close to a region other than the channel region of the transistor. As a result, display quality may deteriorate due to the occurrence of black spots or the like.

SUMMARY

An electro-optical device includes a substrate, a pixel electrode, a transistor disposed in a layer between the pixel electrode and the substrate, a gate relay electrode disposed in a layer between the pixel electrode and the transistor, and a light shielding layer disposed in a layer between the gate relay electrode and the transistor. The gate relay electrode is electrically coupled to a gate electrode of the transistor, and includes an opening portion at a position overlapping, at least in plan view, a gap formed between the gate electrode and the light shielding layer in plan view.

An electronic apparatus includes the electro-optical device described above.

DESCRIPTION OF EXEMPLARY EMBODIMENTS

Embodiments of the present disclosure will be described below with reference to the accompanying drawings.

Here, in each of the following drawings, the scale of each of members is made different from that of actual members, in order to cause each of the members to be of a recognizable size. Further, in order to facilitate understanding, some parts are schematically illustrated.

In each of the drawings, for convenience of explanation, the description will be made using an X-axis, a Y-axis, and a Z-axis, which are orthogonal to each other, as appropriate. Further, one direction along the X-axis is referred to as an X1 direction, and a direction opposite to the X1 direction is referred to as an X2 direction. One direction along the Y-axis is referred to as a Y1 direction, and a direction opposite to the Y1 direction is referred to as a Y2 direction. One direction along the Z-axis is referred to as a Z1 direction, and a direction opposite to the Z1 direction is referred to as a Z2 direction.

Hereinafter, viewing in the Z1 direction or the Z2 direction is referred to as "plan view" or "planar". Viewing from a direction perpendicular to a cross section including the Z-axis is referred to as a "cross-sectional view" or "cross-sectional".

Furthermore, in the following description, for example, with respect to a substrate, the expression "on the substrate" means any one of a case of being disposed in contact with the substrate, a case of being disposed on the substrate with another structural member interposed therebetween, or a case of being disposed on the substrate so as to be partially in contact with the substrate and to partially have another structural member interposed therebetween.

1. First Embodiment 1.1 Overview of Electro-Optical Device

Figure 1:
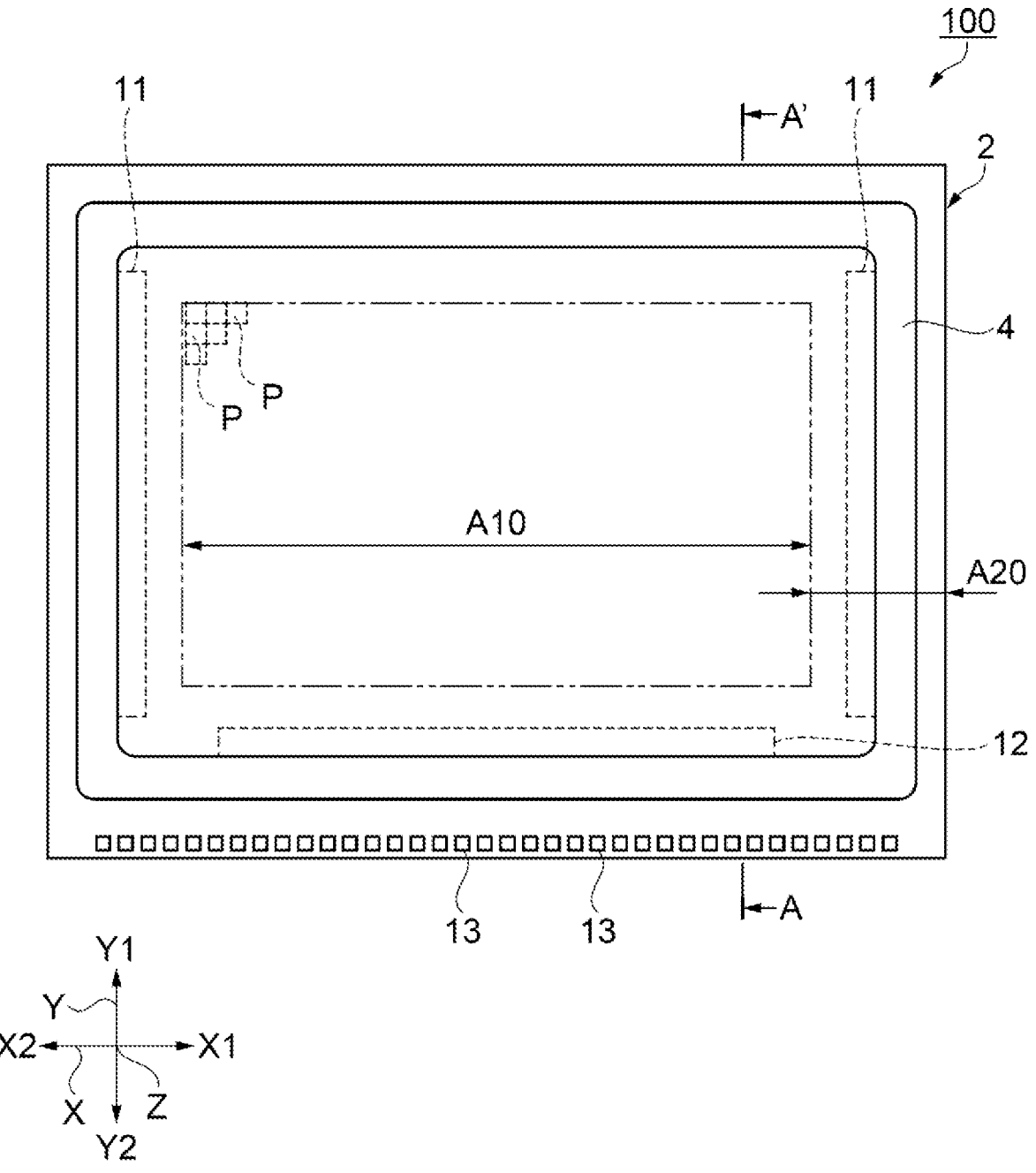
FIG. 1 is a plan view schematically illustrating a configuration of an electro-optical device according to a first embodiment.

FIG. 1 is a plan view schematically illustrating a configuration of an electro-optical device.

In the embodiment, a description will be made using an active drive type liquid crystal device 100 including a thin film transistor (TFT) for each of pixels as an example of the electro-optical device. The liquid crystal device 100 can be used favorably as a light modulation device in a projection-type display device 400 described below as an electronic apparatus, for example.

As illustrated in FIG. 1, the electro-optical device 100 includes an element substrate 2 and a counter substrate that is not illustrated.

The element substrate 2 includes a display region A10 for displaying an image, and a peripheral region A20 positioned outside the display region A10 in plan view. A plurality of pixels P are arranged in a matrix pattern in the display region A10. Further, a sealing member 4, a scanning line drive circuit 11, a data line drive circuit 12, a plurality of external terminals 13, and the like are disposed in the peripheral region A20 surrounding the display region A10 in plan view.

Figure 2:
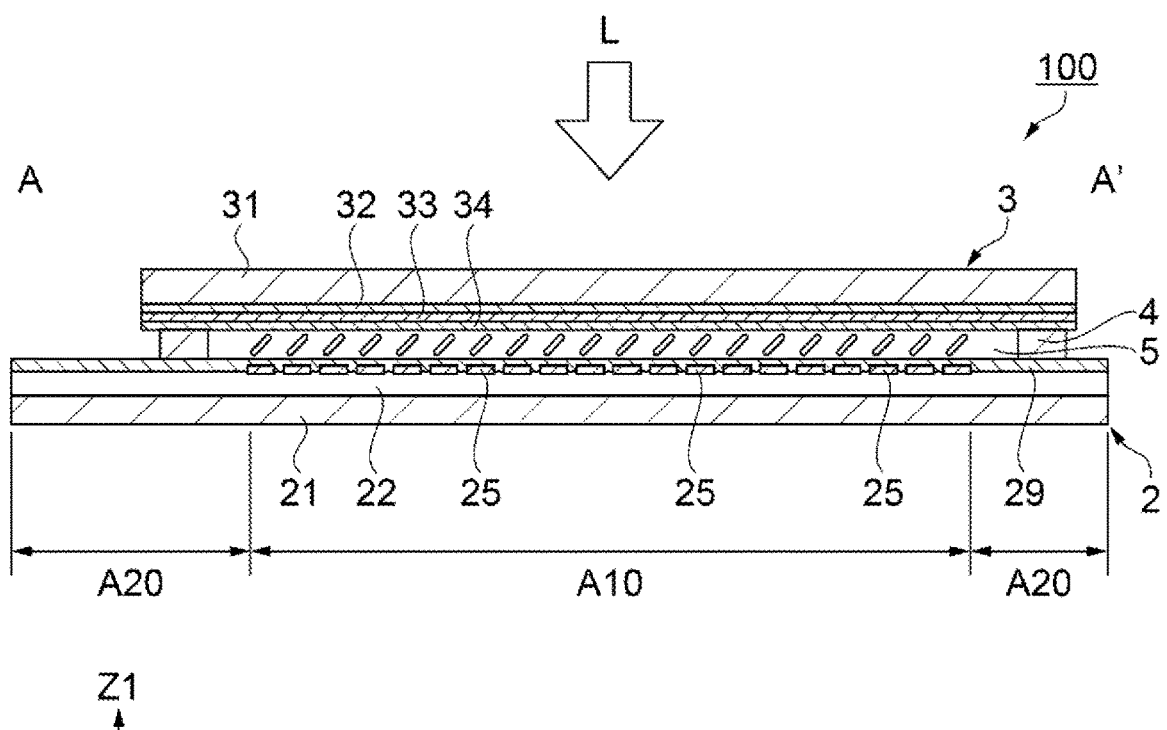
FIG. 2 is a cross-sectional view along a line A-A' illustrated in FIG. 1.

FIG. 2 is a cross-sectional view schematically illustrating a configuration of the liquid crystal device, along a line A-A' illustrated in FIG. 1.

As shown in FIG. 2, in the liquid crystal device 100, the element substrate 2, a liquid crystal layer 5, and a counter substrate 3 are arranged in this order in the Z1 direction. The element substrate 2 and the counter substrate 3 have are transmissive. In the following description, "transmissive" refers to optical transparency with respect to visible light, and preferably means that a transmittance of visible light is equal to or greater than 50%.

The element substrate 2 includes a first substrate 21, a stacked body 22, a plurality of pixel electrodes 25, and a first alignment layer 29. The first substrate 21 is a transmissive flat plate having insulating properties. The first substrate 21 includes, for example, a glass substrate or a quartz substrate. A TFT to be described later is disposed on the stacked body 22. Note that the stacked body 22 will be described later. Further, each of the pixel electrodes 25 is transmissive. For example, each of the pixel electrodes 25 includes a transparent conductive material, such as indium tin oxide (ITO) or indium zinc oxide (IZO), fluorine-doped tin oxide (FTO), or the like. A thickness direction of the pixel electrode 25 corresponds to the Z1 direction or the Z2 direction. The first alignment layer 29 is transmissive and has insulating properties.

The first alignment layer 29 aligns the liquid crystal molecules of the liquid crystal layer 5. Examples of the material of the first alignment layer 29 include silicon oxide ($SiO_2$) and polyimide.

The counter substrate 3 includes a second substrate 31, an insulating layer 32, a common electrode 33, and a second alignment layer 34.

The second substrate 31 is a transmissive flat plate having insulating properties. The second substrate 31 includes, for example, a glass substrate or a quartz substrate.

The insulating layer 32 is transmissive and has insulating properties. The material of the insulating layer 32 is, for example, an inorganic material, such as silicon oxide and the like.

The common electrode 33 is a counter electrode disposed facing the plurality of pixel electrodes 25 via the liquid crystal layer 5. The common electrode 33 includes, for example, a transparent conductive material such as ITO, IZO, and FTO.

The pixel electrodes 25 and the common electrode 33 apply an electric field to the liquid crystal layer 5.

The second alignment layer 34 is transmissive and has insulating properties. The second alignment layer 34 aligns the liquid crystal molecules of the liquid crystal layer 5. Examples of the material of the second alignment layer 34 include silicon oxide or polyimide.

The sealing member 4 is disposed between the element substrate 2 and the counter substrate 3 and bonds the element substrate 2 and the counter substrate 3 together. The sealing member 4 is formed using an adhesive containing various types of curable resins such as epoxy resin, for example. The sealing member 4 may include a gap material constituted by an inorganic material such as glass or the like.

The liquid crystal layer 5 is disposed in a region surrounded by the element substrate 2, the counter substrate 3, and the sealing member 4. The liquid crystal layer 5 is an electro-optical layer whose optical characteristics change in accordance with an electric field. The liquid crystal layer 5 contains the liquid crystal molecules having positive or negative dielectric anisotropy. The alignment of the liquid crystal molecules changes according to a voltage applied to the liquid crystal layer 5. The liquid crystal layer 5 can perform gradation display by modulating light L incident on the liquid crystal layer 5 in accordance with the applied voltage.

1.2 Overview of Pixel Circuit

Figure 3:
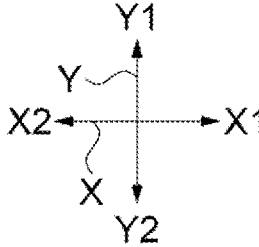
FIG. 3 is an equivalent circuit diagram illustrating an electrical configuration of the electro-optical device.

FIG. 3 is an equivalent circuit diagram illustrating an electrical configuration of the display region of the element substrate.

n scanning lines 241, m data lines 242, and k constant potential lines 243 are provided on the first substrate 21 of the element substrate 2. n, m, and k are each an integer of 2 or greater.

A TFT 23 serving as a pixel transistor is provided corresponding to each of intersections between the n scanning lines 241 and the m data lines 242.

The scanning lines 241 extend in the X1 direction, and the n scanning lines 241 are arranged at equal intervals in the Y1 direction. Scanning signals G1, G2, . . . , and Gn are line-sequentially supplied from the scanning line drive circuit 11 illustrated in FIG. 1 to the n scanning lines 241.

The data lines 242 extend in the Y1 direction, and the m data lines 242 are arranged at equal intervals in the X1 direction. Image signals S1, S2, . . . , and Sm are line-sequentially supplied from the data line drive circuit 12 illustrated in FIG. 1 to the m data lines 242.

The scanning line 241 is electrically coupled to the gate of the TFT 23, the data line 242 is electrically coupled to the source of the TFT 23, and the pixel electrode 25 and a first capacitance electrode 261 of a capacitance element 260 is electrically coupled to the drain of the TFT 23.

The constant potential lines 243 extend in the Y1 direction and are arranged at equal intervals in the X1 direction. A fixed potential such as a common potential supplied to the common electrode 33 is applied to each of the constant potential lines 243. The constant potential line 243 is a capacitance line electrically coupled to a second capacitance electrode 262 of the capacitance element 260.

1.3 Overview of Vertical Structure of Element Substrate

Figure 4:
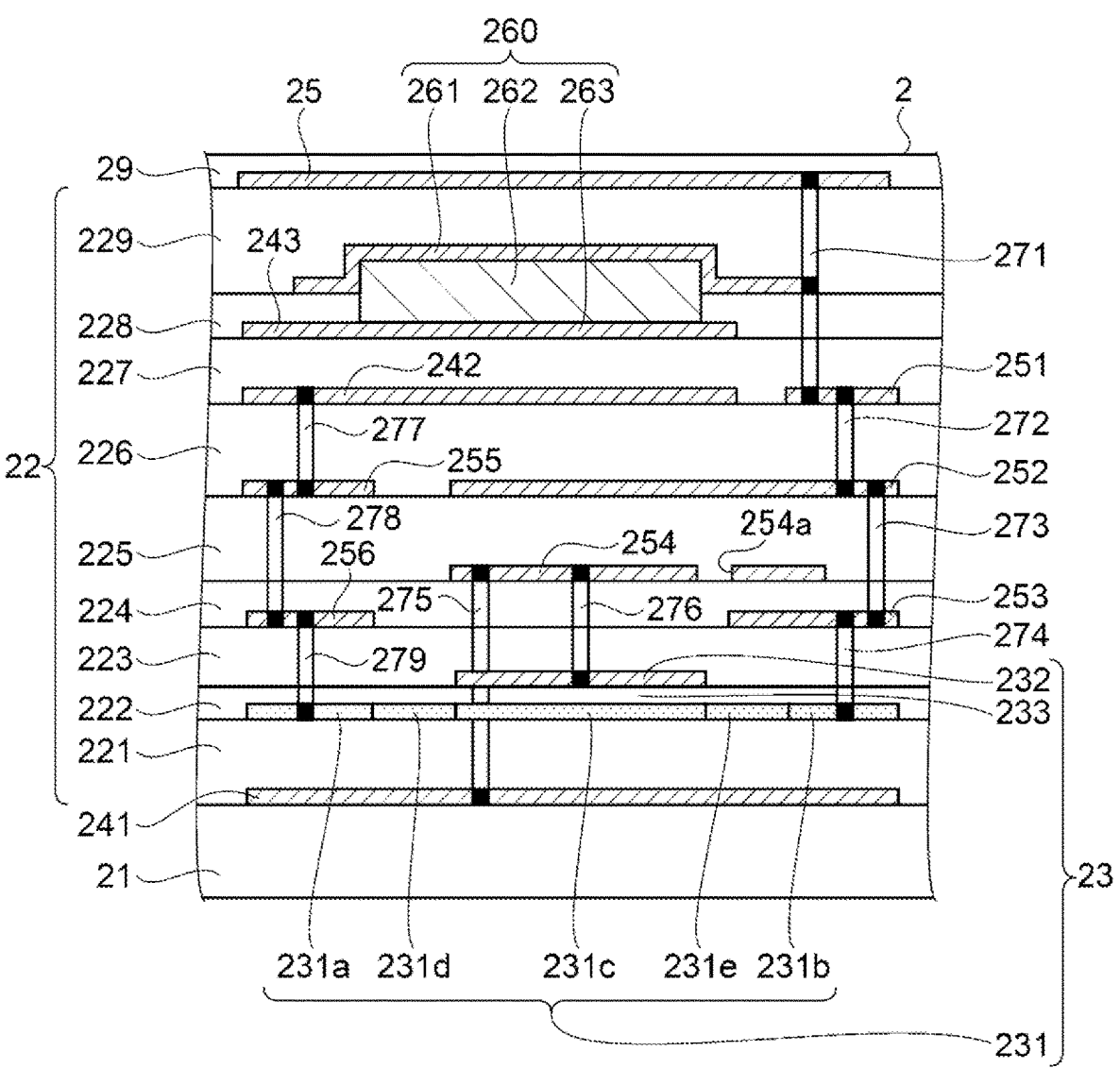
FIG. 4 is an explanatory view schematically illustrating a vertical structure of an element substrate.

FIG. 4 is an explanatory diagram schematically illustrating a vertical structure of the element substrate.

FIG. 4 shows a vertical structure of the element substrate 2 related to the pixel P. The vertical structure schematically illustrates an arrangement relationship and a connection relationship between the stacked body 22 provided on the first substrate 21, the TFT 23 provided between or on the layers of the stacked body 22, the capacitance element 260, the scanning line 241, the data line 242, the constant potential line 243, various relay electrodes such as a first relay electrode 251 and circuit elements such as the pixel electrode 25, and a plurality of conduction portions, such as a first conduction portion 271 and the like, electrically coupled to the various circuit elements.

The stacked body 22 is constituted by a plurality of transmissive insulating layers having insulating properties. Insulating layers 221, 222, 223, 224, 225, 226, 227, 228, and 229 constituting the stacked body 22 are stacked in this order from the first substrate 21 toward the plurality of pixel electrodes 25. The material of each of the layers of the stacked body 22 is an inorganic material such as silicon oxide (SiO), for example.

The scanning line 241 is disposed between the first substrate 21 and the insulating layer 221. The TFT 23 is disposed on the insulating layer 221. The TFT 23 includes a semiconductor layer 231 having a lightly doped drain (LDD) structure, a gate electrode 232, and a gate insulating film 233.

The semiconductor layer 231 is disposed on the insulating layer 221. The semiconductor layer 231 includes a source region 231*a*, a drain region 231*b*, a channel region 231*c*, a first LDD region 231*d*, and a second LDD region 231*e*. Note that at least one of the first LDD region 231*d* and the second LDD region 231*e*, and in particular, the first LDD region 231*d*, may be omitted.

The scanning line 241 and the gate electrode 232 are electrically coupled via a fifth conduction portion 275, a fourth relay electrode 254, and a sixth conduction portion 276.

The pixel electrode 25 is provided on the insulating layer 229. The pixel electrode 25 and the drain region 231*b* of the TFT 23 are electrically coupled to each other via the first conduction portion 271, the first relay electrode 251, a second conduction portion 272, a second relay electrode 252, a third conduction portion 273, a third relay electrode 253, and a fourth conduction portion 274.

The capacitance element 260 includes the first capacitance electrode 261, the second capacitance electrode 262, and a capacitance insulating layer 263. The first capacitance electrode 261 is electrically coupled to an intermediate point of the first conduction portion 271.

The data line 242 is provided between the insulating layer 226, which is the same layer as the first relay electrode 251, and the insulating layer 227. The data line 242 and the source region 231*a* of the TFT 23 are electrically coupled via a seventh conduction portion 277, a fifth relay electrode 255, an eighth conduction portion 278, a sixth relay electrode 256, and a ninth conduction portion 279.

Examples of the material of each of the first conduction portion 271, the second conduction portion 272, the third conduction portion 273, the fourth conduction portion 274, the fifth conduction portion 275, the sixth conduction portion 276, the seventh conduction portion 277, the eighth conduction portion 278, and the ninth conduction portion 279 include metals, such as tungsten (W), cobalt (Co), and copper (Cu), or metal materials, such as metal nitrides and metal silicides. Note that, in the embodiment, the first conduction portion 271 is made of tungsten.

1.4. Overview of Opening Portion

Figure 5:
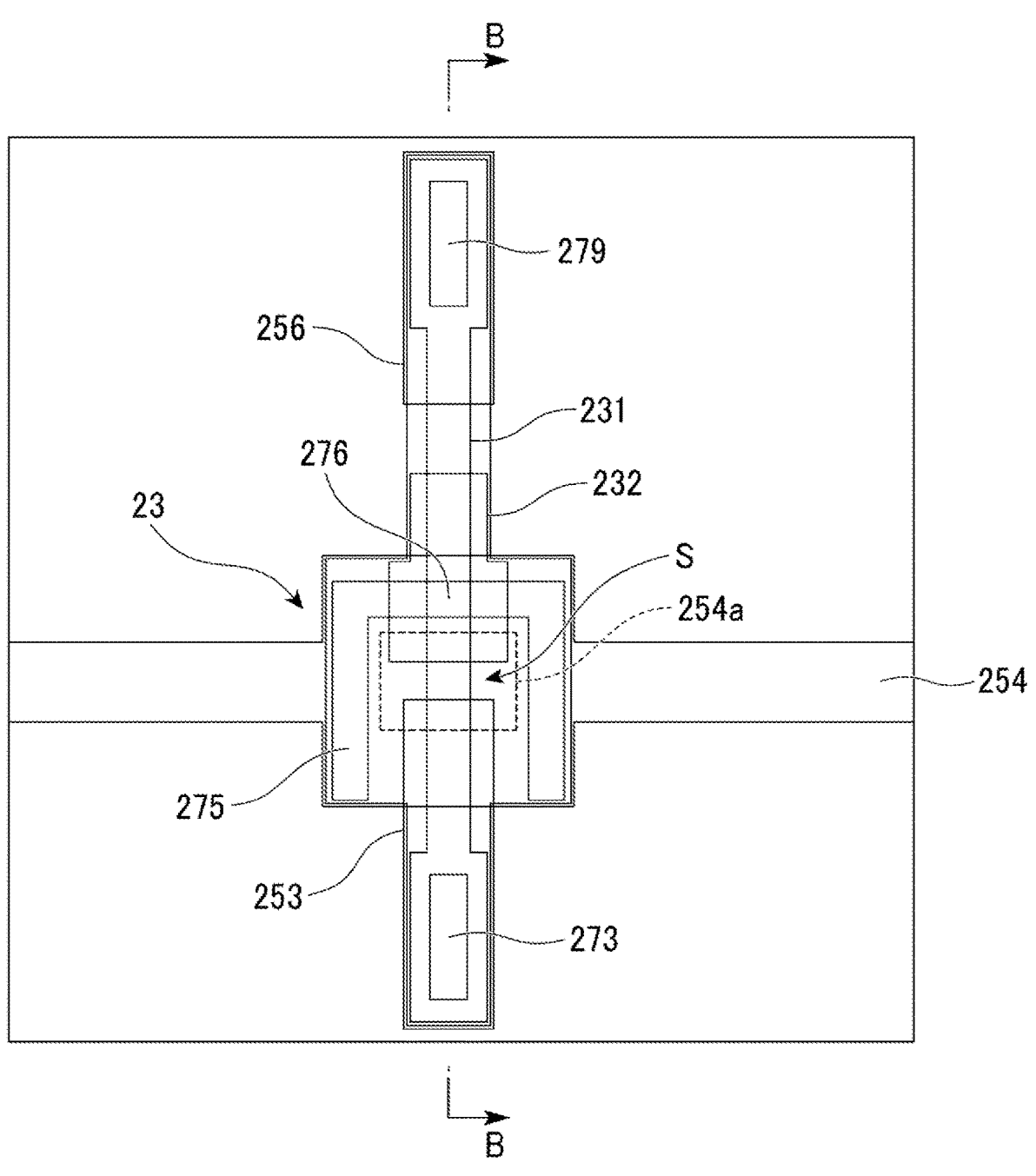
FIG. 5 is a plan view illustrating a configuration of an opening portion.
Figure 6:
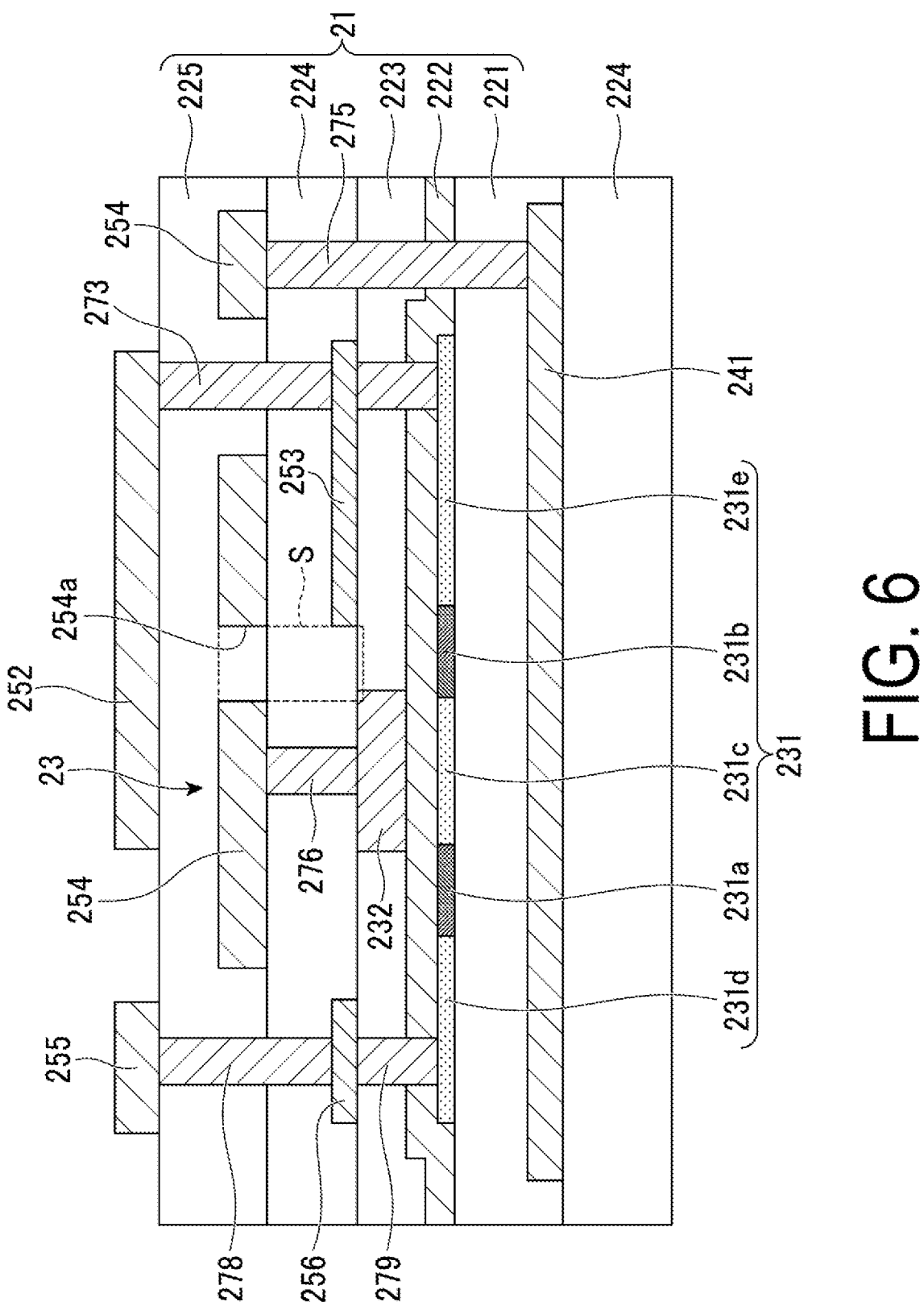
FIG. 6 is a cross-sectional view along a line B-B illustrated in FIG. 5.

FIG. 5 is a plan view illustrating a configuration of an opening portion. FIG. 6 is a cross-sectional view along a line B-B illustrated in FIG. 5.

In the present embodiment, the fourth relay electrode 254 is an example of a "gate relay electrode", the third relay electrode 253 is an example of a "light blocking shield layer", the second relay electrode 252 is an example of a "drain region side wiring layer", the sixth conduction portion 276 is an example of a "first contact hole", the fifth conduction portion 275 is an example of a "second contact hole", and the second LDD region 231*e* is an example of a "drain region side LDD region". Therefore, in the following description, the gate relay electrode 254, the light blocking shield layer 253, the drain region side wiring layer 252, the first contact hole 276, the second contact hole 275, and the drain region side LDD region 231*e* will be described.

As shown in FIG. 5 and FIG. 6, the gate relay electrode 254 is electrically coupled to the gate electrode 232 of the TFT 23 and also, in plan view, includes an opening portion 254*a* at a position overlapping, at least in plan view, a gap S formed between the gate electrode 232 and the light blocking shield layer 253 in plan view.

The gap S is provided at a position overlapping, in plan view, at least the drain region side LDD region 231*e* of the TFT 23. The opening portion 254*a* is open in a range overlapping this LDD region 231*e* at least in plan view. Further, the opening portion 254*a* is open over an area larger than a range overlapping at least the gap S in plan view.

The light blocking shield layer 253 has a light shielding function of preventing light from entering the TFT 23 and a shielding function of blocking application of a potential from the gate relay electrode 254 to the TFT 23. The light blocking shield layer 253 is electrically coupled to the drain region 231*b* of the TFT 23 via the fourth conduction portion 274, in a thickness direction illustrated in FIG. 6.

The drain region side wiring layer 252 is electrically coupled to the light blocking shield layer 253 via the third conduction portion 273, and is provided so as to overlap at least the opening portion 254*a* in plan view.

The scanning line 241 functions as a back gate of the TFT 23 in addition to having a light shielding function of preventing light from entering the TFT 23 from the first substrate 21 (the element substrate 2) side. Therefore, in the thickness direction illustrated in FIG. 6, the gate relay electrode 254 and the gate electrode 232 are electrically coupled via the first contact hole 276. Further, in the thickness direction illustrated in FIG. 6, the gate relay electrode 254 and the scanning line 241 are electrically coupled via the second contact hole 275.

The first contact hole 276 and the second contact hole 275 are integrally provided so as to surround the periphery of the opening portion 254*a* in a U-shape in the plan view illustrated in FIG. 5.

As described above, according to the liquid crystal device 100 according to the embodiment, the following advantages can be obtained.

In the liquid crystal device 100 serving as the electro-optical device, the gate relay electrode 254 is electrically coupled to the gate electrode 232 of the TFT 23, and also includes the opening portion 254*a* at the position overlapping, at least in plan view, the gap S formed between the gate electrode 232 and the light blocking shield layer 253 in plan view.

Further, the gap S is provided at the position overlapping, in plan view, at least the drain region side LDD region 231*e* of the TFT, and the opening portion 254*a* is open to be larger than the gap S, in a range overlapping this LDD region 231*e* at least in plan view.

According to this configuration, it is possible to reduce an influence of the potential transmitted from the gate relay electrode 254 to the drain region side LDD region 231*e*.

Further, in the liquid crystal device 100 serving as the electro-optical device, the drain region side wiring layer 252 is electrically coupled to the light blocking shield layer 253 via the third conduction portion 273, and is provided to overlap at least the opening portion 254*a* in plan view.

According to this configuration, the incidence of light from the opening portion 254*a* to the drain region side LDD region 231*e* can be blocked by the drain region side wiring layer 252.

Further, in the liquid crystal device 100 serving as the electro-optical device, the first contact hole 276 electrically coupling the gate relay electrode 254 and the gate electrode 232 in the thickness direction, and the second contact hole 275 electrically coupling the gate relay electrode 254 and the scanning line 241 in the thickness direction are integrally provided so as to surround the periphery of the opening portion 254*a* in plan view.

According to this configuration, the incidence of light from the opening portion 254a to the drain region side LDD region 231e can be blocked by the first contact hole 276 and the second contact hole 275.

As described above, according to the liquid crystal device 100 serving as the electro-optical device, it is possible to reduce the influence of the potential transmitted from the gate relay electrode 254 to the drain region side LDD region 231e, and to prevent the display quality of the liquid crystal device 100 from deteriorating.

Note that, in the liquid crystal device 100 serving as the electro-optical device, the gap S is provided at a position overlapping, in plan view, the above-described drain region side LDD region 231e of the TFT 23, and the opening portion 254a is provided in the gate relay electrode 254 in a range overlapping the LDD region 231e in plan view. However, a configuration can also be adopted in which a gap is provided at a position overlapping the source region side LDD region (the first LDD region 231d) in plan view, and an opening portion is provided in the gate relay electrode 254 in a range overlapping this LDD region in plan view.

2. Second Embodiment

2.1 Overview of Electronic Apparatus

Figure 7:
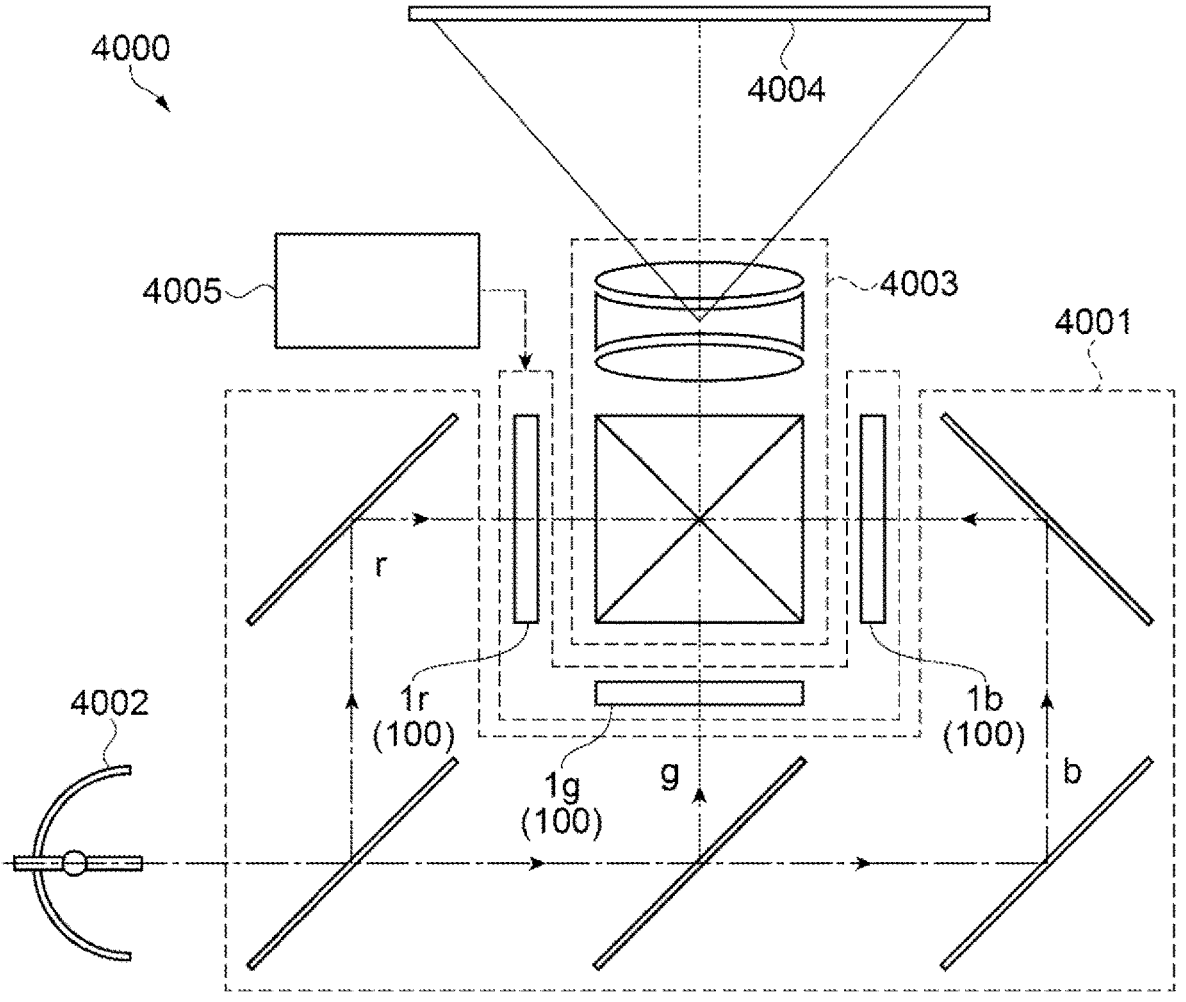
FIG. 7 is a schematic configuration view illustrating a projection-type display device according to a second embodiment.

FIG. 7 is a view schematically illustrating a configuration of a projection-type display apparatus that is an example of the electronic apparatus according to the embodiment.

The projection-type display device 4000 is a three-plate type projector, for example. An electro-optical device 1r is the electro-optical device 100 corresponding to a red display color, an electro-optical device 1g is the electro-optical device 100 corresponding to a green display color, and an electro-optical device 1b is the electro-optical device 100 corresponding to a blue display color. Specifically, the projection-type display device 4000 includes the three electro-optical devices 1r, 1g, and 1b that respectively correspond to the display colors of red, green, and blue. A control unit 4005 includes, for example, a processor and a memory, and controls the operation of the liquid crystal device 100.

An illumination optical system 4001 supplies a red component r, of light emitted from an illumination device 4002 that is a light source, to the electro-optical device 1r, a green component g to the electro-optical device 1g, and a blue component b to the electro-optical device 1b. Each of the electro-optical devices 1r, 1g, and 1b functions as an optical modulator, such as a light valve, that modulates each of monochromatic light supplied from the illumination optical system 4001, in accordance with a display image. A projection optical system 4003 synthesizes the light emitted from each of the electro-optical devices 1r, 1g, and 1b, and projects the synthesized light onto a projection surface 4004.

The electronic apparatus described above includes the above-described liquid crystal device 100. The liquid crystal device 100 may be a liquid crystal device 200. The projection-type display device 4000 can be downsized as a result of being provided with the liquid crystal device 100 that has excellent productivity and is compact.

Note that the electronic apparatus to which the electro-optical device according to the disclosure is applied is not limited to the exemplified apparatus, and includes a personal digital assistant (PDA), a digital still camera, a television, a video camera, a car navigation device, an in-vehicle display, an electronic notebook, electronic paper, a calculator, a word processor, a workstation, a videophone, a point of sale (POS) terminal, a 3D printer, a head-mounted display, and the like.

Further, in the above description, the liquid crystal device is described as the example of the electro-optical device according to the disclosure, but the electro-optical device according to the disclosure is not limited thereto. For example, the electro-optical device according to the disclosure can be applied to an image sensor or the like. Further, for example, the present disclosure can also be applied to a display panel using a light-emitting device, such as an organic electroluminescent (EL) device, an inorganic EL device, a light-emitting polymer, or the like, in a similar manner to the embodiment described above. Further, the present disclosure can also be applied to an electrophoretic display panel that uses a micro capsule including colored liquid and white particles distributed in the liquid, in a similar manner to the embodiment described above.

In each of the embodiments described above, the transistor is a TFT, but may be, for example, a metal-oxide-semiconductor field-effect transistor (MOSFET).

The present disclosure has been described above based on the preferred embodiments, but the present disclosure is not limited to the embodiments described above. Further, the configuration of each component of the present disclosure can be replaced with any chosen configuration that exerts the equivalent functions of the above-described embodiments, or any configuration can be added thereto.

What is claimed is:

1. An electro-optical device comprising:
   a substrate;
   a pixel electrode;
   a transistor disposed in a layer between the pixel electrode and the substrate;
   a scanning line disposed in a layer between the transistor and the substrate;
   a gate relay electrode disposed in a layer between the pixel electrode and the transistor; and
   a light shielding layer disposed in a layer between the gate relay electrode and the transistor, and disposed, in plan view, with a gap between the light shielding layer and a gate electrode of the transistor, wherein
   the gate relay electrode is electrically coupled to the gate electrode, and includes an opening portion at a position overlapping, at least in plan view, the gap between the gate electrode and the light shielding layer in plan view,
   the scanning line is electrically coupled to the gate relay electrode,
   the gate relay electrode and the gate electrode are electrically coupled via a first contact hole,
   the gate relay electrode and the scanning line are electrically coupled via a second contact hole, and
   the first contact hole and the second contact hole are integrally provided surrounding a periphery of the opening portion in plan view.

2. The electro-optical device according to claim 1, wherein
   the gap is positioned at a position overlapping, in plan view, at least a drain region side LDD region of the transistor, and
   the opening portion is open in a range overlapping the drain region side LDD region at least in plan view.

3. The electro-optical device according to claim 1, wherein
   the opening portion is larger than a range overlapping at least the gap in plan view.

4. The electro-optical device according to claim 1, further comprising a drain region side wiring layer disposed in a layer between the pixel electrode and the gate relay electrode, wherein the light shielding layer is electrically coupled to a drain region of the transistor, and the drain region side wiring layer is electrically coupled to the light shielding layer, and is provided overlapping at least the opening portion in plan view.

5. An electronic apparatus, comprising the electro-optical device according to claim 1.

\* \* \* \* \*